(12) United States Patent
Sawa et al.

(10) Patent No.: US 8,211,569 B2
(45) Date of Patent: *Jul. 3, 2012

(54) LITHIUM SECONDARY BATTERY INCLUDING A NEGATIVE ELECTRODE WHICH IS A SINTERED LAYER OF SILICON PARTICLES AND/OR SILICON ALLOY PARTICLES AND A NONAQUEOUS ELECTROLYTE CONTAINING CARBON DIOXIDE DISSOLVED THEREIN AND METHOD FOR PRODUCING SAME

(75) Inventors: Shouichirou Sawa, Tokushima (JP); Hiroshi Minami, Tokushima (JP); Mariko Torimae, Kobe (JP); Atsushi Fukui, Tokushima (JP); Yasuyuki Kusumoto, Kobe (JP); Katsunobu Sayama, Kobe (JP); Maruo Kamino, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 1263 days.

This patent is subject to a terminal disclaimer.

(21) Appl. No.: 10/531,047

(22) PCT Filed: Jun. 4, 2004

(86) PCT No.: PCT/JP2004/007831
§ 371 (c)(1),
(2), (4) Date: Apr. 12, 2005

(87) PCT Pub. No.: WO2004/114453
PCT Pub. Date: Dec. 29, 2004

(65) Prior Publication Data
US 2006/0003226 A1   Jan. 5, 2006

(30) Foreign Application Priority Data

Jun. 19, 2003 (JP) ................................ 2003-174672
Aug. 22, 2003 (JP) ................................ 2003-298906
Dec. 2, 2003 (JP) ................................ 2003-402902
Mar. 12, 2004 (JP) ................................ 2004-071483

(51) Int. Cl.
*H01M 6/14* (2006.01)
*H01M 4/134* (2010.01)
*H01M 4/1395* (2010.01)

(52) U.S. Cl. .............. 429/188; 429/200; 429/218.1; 429/245; 429/338; 29/623.1

(58) Field of Classification Search .................. None
See application file for complete search history.

(56) References Cited

U.S. PATENT DOCUMENTS
4,853,304 A   8/1989   Ebner et al. .................. 429/192
(Continued)

FOREIGN PATENT DOCUMENTS
EP   1 633 013 A1   3/2006
(Continued)

OTHER PUBLICATIONS
Machine Translation of JP 2003-086243, Masatoshi et al., Mar. 20, 2003.*
(Continued)

*Primary Examiner* — Barbara Gilliam
*Assistant Examiner* — Kwang Han
(74) *Attorney, Agent, or Firm* — Kubovcik & Kubovcik

(57) ABSTRACT

A rechargeable lithium battery including a negative electrode made by sintering, on a surface of a conductive metal foil as a current collector, a layer of a mixture of active material particles containing silicon and/or a silicon alloy and a binder, a positive electrode and a nonaqueous electrolyte, characterized in that the nonaqueous electrolyte contains carbon dioxide dissolved therein.

24 Claims, 6 Drawing Sheets

U.S. PATENT DOCUMENTS

| | | | |
|---|---|---|---|
| 5,707,756 A | 1/1998 | Inoue et al. | 429/57 |
| 6,235,427 B1 | 5/2001 | Idota et al. | 429/218.1 |
| 2004/0043294 A1* | 3/2004 | Fukui et al. | 429/235 |
| 2004/0213985 A1* | 10/2004 | Lee et al. | 428/315.7 |

FOREIGN PATENT DOCUMENTS

| | | |
|---|---|---|
| EP | 1 905 739 A1 | 4/2008 |
| JP | 6-124700 A | 5/1994 |
| JP | 6-150975 A | 5/1994 |
| JP | 7-176323 A | 7/1995 |
| JP | 7-249431 A | 9/1995 |
| JP | 8-64246 A | 3/1996 |
| JP | 8-111238 A | 4/1996 |
| JP | 9-63649 A | 3/1997 |
| JP | 10-40958 A | 2/1998 |
| JP | 2000-12089 A | 1/2000 |
| JP | 2001-6734 A | 1/2001 |
| JP | 2001-307771 A | 11/2001 |
| JP | 2002-260637 A | 9/2002 |
| JP | 2002-329502 A | 11/2002 |
| JP | 2003-86243 A | 3/2003 |
| JP | 2003-092146 A | 3/2003 |
| WO | 02/21616 A1 | 3/2002 |

OTHER PUBLICATIONS

Machine translation of JP 10-040958, Hiroshi et al.*

* cited by examiner

LITHIUM SECONDARY BATTERY INCLUDING A NEGATIVE ELECTRODE WHICH IS A SINTERED LAYER OF SILICON PARTICLES AND/OR SILICON ALLOY PARTICLES AND A NONAQUEOUS ELECTROLYTE CONTAINING CARBON DIOXIDE DISSOLVED THEREIN AND METHOD FOR PRODUCING SAME

This application is a 371 of international application PCT/JP2004/007831, which claims priority based on Japanese patent application Nos. 2003-174672, 2003-298906, 2003-402902 and 2004-071483 filed Jun. 19, 2003, Aug. 22, 2003, Dec. 2, 2003, and Mar. 12, 2004, respectively, which are incorporated herein by reference.

TECHNICAL FIELD

The present invention relates to a rechargeable lithium battery and also to a method for fabrication thereof.

BACKGROUND ART

As one of new types of high-power and high-energy density rechargeable batteries, a rechargeable lithium battery has been recently utilized which is charged and discharged by the transfer of lithium ions through an on aqueous electrolyte solution between the positive and negative electrodes.

For such a rechargeable lithium battery, a negative electrode using a lithium-alloying material, such as silicon, for the negative active material has been studied. However, in the case where the lithium-alloying material, such as silicon, is used as the active material of the negative electrode, the active material is powdered or delaminated from the current collector during charge and discharge because the active material expands and shrinks in volume when it stores and releases lithium. This lowers a current-collecting capacity of the electrode and accordingly deteriorates charge-discharge cycle performance characteristics, which has been a problem.

In order to solve the above-described problem, the present applicant has proposed a negative electrode, for use in rechargeable lithium batteries, which is obtained by providing, on a surface of a current collector, a layer of a mixture containing a binder and active material particles containing silicon and/or a silicon alloy and then sintering the mixture layer while placed on the current collector (Patent Document 1).

For rechargeable lithium batteries using carbon material or metallic lithium as a negative active material, dissolving carbon dioxide in nonaqueous electrolytes or encapsulating carbon dioxide in a battery has been proposed (Patent Documents 2-12).

The rechargeable lithium battery described above as a proposal of the present applicant exhibits a high charge-discharge capacity and shows superior cycle performance characteristics. However, the active material particles in the negative electrode increase in porosity with repetitive charge-discharge cycling to result in the increased thickness of the negative electrode, which has been a problem.

Patent Document 1: PCT Int. Publication No. WO 02/21,616
Patent Document 2: U.S. Pat. No. 4,853,304
Patent Document 3: Japanese Patent Laid-Open No. Hei 6-150975
Patent Document 4: Japanese Patent Laid-Open No. Hei 6-124700
Patent Document 5: Japanese Patent Laid-Open No. Hei 7-176323
Patent Document 6: Japanese Patent Laid-Open No. Hei 7-249431
Patent Document 7: Japanese Patent Laid-Open No. Hei 8-64246
Patent Document 8: Japanese Patent Laid-Open No. Hei 9-63649
Patent Document 9: Japanese Patent Laid-Open No. Hei 10-40958
Patent Document 10: Japanese Patent Laid-Open No. 2001-307771
Patent Document 11: Japanese Patent Laid-Open No. 2002-329502
Patent Document 12: Japanese Patent Laid-Open No. 2003-86243

DISCLOSURE OF THE INVENTION

It is an object of the present invention to provide a rechargeable lithium battery using a negative electrode including active material particles containing silicon and/or a silicon alloy, which has a high charge-discharge capacity and shows superior cycle performance characteristics and which can suppress increase in porosity of the active material particles during charge and discharge and accordingly reduce an increase in thickness of the electrode after charge and discharge, as well as providing a method for fabrication thereof.

The rechargeable lithium battery of the present invention includes a negative electrode made by sintering a layer of a mixture of active material particles containing silicon and/or a silicon alloy and a binder on a surface of a conductive metal foil current collector, a positive electrode and a nonaqueous electrolyte. Characteristically, the nonaqueous electrolyte contains carbon dioxide dissolved therein.

In the present invention, the nonaqueous electrolyte contains carbon dioxide dissolved therein. This means that the nonaqueous electrolyte contains carbon dioxide purposely or intentionally dissolved therein. Although carbon dioxide inevitably dissolves in a nonaqueous electrolyte during a general fabrication process of rechargeable lithium batteries, carbon dioxide such dissolved is not meant to be included within the scope. Carbon dioxide generally dissolves in a solvent of a nonaqueous electrolyte. Thus, the nonaqueous electrolyte may be prepared by dissolving a solute and then carbon dioxide into a solvent. Alternatively, the nonaqueous electrolyte may be prepared by dissolving carbon dioxide and then a solute into a solvent.

A porosity increase of the active material particles, which occurs with a charge-discharge reaction, can be retarded by dissolving carbon dioxide in a nonaqueous electrolyte. Accordingly, a thickness increase of a layer of active material particles during charge and discharge can be suppressed to result in the increased volumetric energy density of the rechargeable lithium battery.

The negative electrode prepared by sintering a layer of a mixture of active material particles containing silicon and/or a silicon alloy and a binder on a surface of a conductive metal foil current collector exhibits a high charge-discharge capacity and shows superior charge-discharge performance characteristics. The inventors of this application have found that, as a charge-discharge reaction is repeated in such an electrode, the active material particle shows a gradual porosity increase that starts from its surface and develops toward its inside. As the porosity increases, the thickness of the electrode increases. As a result, the volumetric energy density of the electrode decreases. Such porosity increase of the active material is believed due to the property change of the silicon active material that occurs as it undergoes an irreversible reaction.

Dissolving of carbon dioxide in a nonaqueous electrolyte, in accordance with the present invention, suppresses a porosity increase of the active material. This accordingly suppresses a thickness increase of the electrode and thereby increases a volumetric energy density of the electrode. The detailed reason why the porosity increase of the active material particle can be suppressed when a nonaqueous electrolyte contains an amount of dissolved carbon dioxide is not clear, but is most probably due to the formation of a stable film having a superior lithium-ion conducting capability on a particle surface.

In the present invention, in the preparation of the negative electrode, sintering is preferably performed under a non-oxidizing atmosphere.

In the present invention, the amount of carbon dioxide dissolved in a nonaqueous electrolyte is preferably at least 0.001% by weight, more preferably at least 0.01% by weight, further preferably at least 0.05% by weight, further preferably at least 0.1% by weight. It is generally preferred that carbon dioxide is dissolved in a nonaqueous electrolyte to saturation. The above-specified amount of dissolved carbon dioxide does not include the amount of carbon dioxide which inevitably dissolves in a nonaqueous electrolyte, i.e., excludes the amount of carbon dioxide which dissolves in a nonaqueous electrolyte during a general fabrication process of rechargeable lithium batteries. The above-specified amount of dissolved carbon dioxide can be determined by measuring a weight of a nonaqueous electrolyte both after and before dissolving of carbon dioxide in the nonaqueous electrolyte. Specifically, the amount of dissolved carbon dioxide can be calculated using the following equation:

Amount of carbon dioxide dissolved in a nonaqueous electrolyte (weight %)=[(weight of the nonaqueous electrolyte after dissolving of carbon dioxide therein)−(weight of the nonaqueous electrolyte before dissolving of carbon dioxide therein)]/(weight of the nonaqueous electrolyte after dissolving of carbon dioxide therein)×100.

In the present invention, it is preferred that carbon dioxide is also contained in an inner space of the battery. Such an inner space of the battery may be provided between a battery casing and an electrode assembly which includes opposing positive and negative electrodes and a separator sandwiched between them, for example. Carbon dioxide can be contained in the space by performing battery assembling under a carbon dioxide atmosphere or by allowing release of the dissolved carbon dioxide from the electrolyte into the space. As carbon dioxide in the electrolyte is consumed during charge and discharge, the carbon dioxide in the space dissolves into the electrolyte so that carbon dioxide can be supplied into the electrolyte.

In this invention, the nonaqueous electrolyte preferably contains a fluorine-containing compound. Inclusion of such a compound in the nonaqueous electrolyte further improves cycle performance characteristics.

Examples of fluorine-containing compounds include fluorine-containing lithium salts and fluorine-containing solvents.

Examples of such fluorine-containing lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiXF_y$ (wherein X is P, As, Sb, B, Bi, Al, Ga or In; y is 6 if X is P, As or Sb and y is 4 if X is B, Bi, Al, Ga or In), lithium perfluoroalkylsulfonyl imide $LiN(C_mF_{2m+1}SO_2)(C_nF_{2n+1}SO_2)$ (wherein m and n are independently integers of 1-4), lithium perfluoroalkylsulfonyl methide $LiC(C_pF_{2p+1}SO_2)(C_qF_{2q+1}SO_2)(C_rF_{2r+1}SO_2)$ (wherein p, q and r are independently integers of 1-4), and the like.

Examples of fluorine-containing solvents include compounds derived by substituting fluorine atoms for hydrogen atoms in cyclic carbonates, such as butylene carbonate and propylene carbonate, and in chain carbonates such as dimethyl carbonate and diethyl carbonate. Specific examples include trifluoromethylated propylene which is derived by substituting fluorine atoms for hydrogen atoms in propylene carbonate, 1,1,1-trifluorodiethyl carbonate ($CF_3CH_2OCOOCH_2CH_3$), trifluoro ethyl methyl carbonate ($CF_3CH_2OCOOCH_3$). Other useful compounds include those derived by substituting fluorine atoms for hydrogen atoms in ether solvents, such as 1,2-dimethoxyethane and 1,2-diethoxyethane, and in cyclic esters such as γ-butyrolactone. A specific example is bis-1,2-(2,2,2-trifluoroethoxy) ethane ($CF_3CH_2OCH_2CH_2OCH_2CF_3$).

In the case where the fluorine-containing lithium salt is used as a solute for the nonaqueous electrolyte, it is added preferably in the concentration of 0.1-2 mole/liter of the nonaqueous electrolyte. A total amount of the lithium salt is preferably 0.5-2 mole/liter. If the concentration is below 0.1 mole/liter, the effect of containing fluorine may not be obtained sufficiently. If the total amount of the lithium salt is below 0.5 mole/liter, a sufficient lithium-ion conducting capability may not be obtained for the nonaqueous electrolyte. If the concentration exceeds 2 mole/liter, the nonaqueous electrolyte may undesirably increase in viscosity and decrease in ionic conductivity. Also, a salt may be undesirably separated out at low temperatures.

Where the fluorine-containing compound is used as a solvent for the nonaqueous electrolyte, it is preferably used in the concentration of at least 1% of the total volume of all solvents. If the concentration is below 1% by volume, the effect of containing fluorine may not be obtained sufficiently.

In the present invention, a fluorine-containing compound of the type that is hard to dissolve in the electrolyte may be preloaded in the separator. Also, a fluorine-containing compound may be preloaded in the anode mix layer. Such a compound can be illustrated by lithium fluoride.

Where the fluorine-containing compound is added to the anode mix layer, it is preferably loaded in the amount of 0.05-5% of the total weight of the anode mix. If below 0.05% by weight, the effect of containing fluorine may not be obtained sufficiently. On the other hand, if above 5% by weight, a resistance of the active material layer may increase to an undesirable level.

The active material particles for use in the present invention may be composed of silicon and/or a silicon alloy. Examples of silicon alloys include solid solutions of silicon and other one or more elements, intermetallic compounds of silicon with other one or more elements and eutectic alloys of silicon and other one or more elements. Alloying can be achieved by such methods as arc melting, liquid quenching, mechanical alloying, sputtering, chemical vapor growth and firing. Examples of liquid quenching methods include a single roller quenching method, a twin roller quenching method and various atomizing methods including gas atomizing, water atomizing and disk atomizing.

The active material particles for use in the present invention may also comprise silicon and/or silicon alloy particles with surfaces being coated with a metal or the other. Coating can be achieved by such methods as electroless plating, electrolytic plating, chemical reduction, vapor deposition, sputtering and chemical vapor deposition. Preferably, the coating metal is the same type of metal as the metal foil current collector. In the sintering, the active material particles if coated with the metal identical in type to the metal foil exhibit a marked improvement in adhesion to the current collector. As a result, further improved charge-discharge cycle performance characteristics can be obtained.

The active material particles for use in the present invention may include particles composed of material that alloys with lithium. Examples of lithium-alloying materials include germanium, tin, lead, zinc, magnesium, sodium, aluminum, gallium, indium and their alloys.

A mean particle diameter of the active material particles for use in the present invention is not particularly specified but may preferably be 100 µm or below, more preferably 50 µm or below, most preferably 10 µm or below, to insure effective sintering. The better cycle performance characteristics can be obtained as the mean particle diameter of the active material particles becomes smaller. A mean particle diameter of the conductive powder for incorporation in the mix layer is not particularly specified but may preferably be up to 100 µm, more preferably up to 50 µm, most preferably up to 10 µm.

The use of active material particles having a smaller mean particle diameter reduces an absolute amount of volumetric expansion and shrinkage of the active material as it stores and releases lithium by a charge-discharge reaction and accordingly reduces an absolute amount of a strain that is produced between active material particles in the electrode during a charge-discharge reaction. This prevents breakage of the binder, suppresses reduction of a current-collecting capability of the electrode and improves charge-discharge cycle performance characteristics.

It appears in the present invention that carbon dioxide dissolved in the nonaqueous electrolyte acts to form a stable film having a high lithium-ion conducting capability on a surface of the active material particle, as described earlier. The use of active material particles having a smaller mean particle diameter then results in the denser arrangement of the high lithium-ion conducting films throughout the mix layer. The formation of the denser lithium-ion conducting paths in the mix layer is believed to allow a charge-discharge reaction to occur in more uniformly distributed regions in the electrode. This prevents the active material from being broken by a strain produced when the active material undergoes a biased volumetric change as it stores and releases lithium, and accordingly reduces the tendency of the active material particles to form new surfaces and, as a result, further improves charge-discharge cycle performance characteristics.

The active material particles preferably have as narrow a size distribution as possible. The wide particle size distribution creates a large difference between the active material particles having largely differing sizes, in terms of an absolute amount of volumetric expansion or shrinkage of the active material particle as it stores and releases lithium. This large difference produces a strain in the anode mix layer that causes breakage of the binder. The current-collecting capability of the electrode then decreases to thereby deteriorate cycle performance characteristics.

A surface of the current collector in the present invention preferably has an arithmetic mean roughness Ra of at least 0.2 µm. The use of the current collector having the above-specified arithmetic mean surface roughness Ra increases a contact area of the current collector with the mix layer and accordingly improves adhesion between them. This further improves a current-collecting capability of the electrode. In the case where the mix layer is disposed each surface of the current collector, the current collector preferably has an arithmetic mean surface roughness Ra of at least 0.2 µm.

The arithmetic mean roughness Ra is defined in Japanese Industrial Standards (JIS B 0601-1994) and can be measured as by a surface roughness meter.

In the present invention, the thickness of the current collector is not particularly specified, but is preferably in the range of 10-100 µm.

In the present invention, an upper limit of the arithmetic mean roughness Ra of the current collector surface is not particularly specified. However, its substantial value is preferably 10 µm or below because the thickness of the current collector is preferably in the range of 10-100 µm, as described above.

The current collector in the present invention preferably comprises an electrically conductive metal foil which may be composed of a metal such as copper, nickel, iron, titanium or cobalt, or an alloy containing any combination thereof, for example. It is particularly preferred that the conductive metal foil contains a metal element that readily diffuses into the active material. From this point of view, the conductive metal foil preferably comprises a copper foil or a copper alloy foil. Since copper, when heat treated, readily diffuses into the silicon active material, sintering is expected to improve adhesion between the current collector and the active material. For this purpose, the current collector may comprise a metal foil having a layer containing a copper element on its surface in contact with the active material. Therefore, in the case where a metal foil composed of a metal element other than copper is used, a copper or copper alloy layer is preferably provided on a surface of the metal foil.

The preferred copper alloy foil is a heat-resisting copper foil. The heat-resisting copper alloy, as used herein, refers to a copper alloy which exhibits a tensile strength of at least 300 MPa after one hour of annealing at 200° C. Examples of useful heat-resisting copper alloys are listed in Table 1.

TABLE 1

| | (% on a Weight Basis) |
|---|---|
| Type | Composition |
| Tin-Containing Copper | 0.05-0.2% Sn and 0.04% or Less P Added to Cu |
| Silver-Containing Copper | 0.08-0.25% Ag Added to Cu |
| Zirconium-Copper (Used in Examples) | 0.02-0.2% Zr Added to Cu |
| Chromium-Copper | 0.4-1.2% Cr Added to Cu |
| Titanium-Copper | 1.0-4.0% Ti Added to Cu |
| Beryllium-Copper | 0.4-2.2% Be, Slight Amounts of Co, Ni and Fe Added to Cu |
| Iron-Containing Copper | 0.1-2.6% Fe and 0.01-0.3% P Added to Cu |
| High-Strength Brass | 2.0% or Less Al, 3.0% or Less Mn and 1.5% or Less Fe Added to Brass of 55.0-60.5% Cu |
| Tin-Containing Brass | 80.0-95.0% Cu, 1.5-3.5% Sn and a Balance of Zn |
| Phosphor Bronze | Mainly of Cu and Containing 3.5-9.0% Sn and 0.03-0.35% P |
| Aluminum Bronze | Containing 77.0-92.5% Cu, 6.0-12.0% Al, 1.5-6.0% Fe, 7.0% or Less Ni and 2.0% or Less Mn |
| White Copper | Mainly of Cu and Containing 9.0-33.0% Ni, 0.40-2.3% Fe, 0.20-2.5% Mn and 1.0% or Less Zn |
| Corson Alloy | 3% Ni, 0.65% Si and 0.15% Mg in Cu |
| Cr—Zr—Cu Alloy | 0.2% Cr, 0.1% Zr and 0.2% Zn in Cu |

As described earlier, the current collector for use in the present invention preferably has large irregularities on its surface. Unless the arithmetic mean roughness Ra of the heat-resisting copper alloy foil is sufficiently large, an electrolytic copper or copper alloy may be superimposed on a surface of the foil to provide large irregularities on the surface. Such electrolytic copper and copper alloy layers can be formed through an electrolytic process.

Also in the present invention, the current collector may be subjected to a surface-roughening treatment to provide large irregularities on its surface. Examples of such surface-roughening treatments include vapor growth processes, etching and polishing. Examples of vapor growth processes include sputtering, CVD and vapor deposition. Etching may be achieved either physically or chemically. Polishing may be carried out using a sand paper or with blast.

In the present invention, a thickness X of the mix layer, a thickness Y of the current collector and an arithmetic mean roughness Ra of its surface preferably meet the relationships $5Y \geqq X$ and $250Ra \geqq X$. If the thickness X of the mix layer exceeds 5Y or 250Ra, the occasional separation of the mix layer from the current collector may result.

The thickness X of the anode mix layer is not particularly specified but is preferably 1,000 μm or below, more preferably 10 μm-100 μm.

In the present invention, an electrically conductive powder can be incorporated in the mix layer. Such a conductive powder, when loaded, surrounds particles of active material to form an electrically conductive network, resulting in further improving the current-collecting capability of the electrode. The conductive powder is preferably made from the same material as contained in the current collector. Specific examples of useful materials include metals such as copper, nickel, iron, titanium and cobalt; alloys and mixtures of any combination thereof. Among those metal powders, a copper powder is particularly useful. The use of a conductive carbon powder is also preferred.

Preferably, the conductive powder is loaded in the mix layer in the amount that does not exceed 50% of the total weight of the conductive powder and active material particles. If the loading of the conductive powder is excessively high, an amount of the active material particles becomes relatively small to result in reducing a charge-discharge capacity of the electrode.

The binder for use in the present invention is preferably of the type that remains fully undecomposed after the heat treatment for sintering. As stated above, sintering improves adhesion between the active material particles and the current collector and between the active material particles themselves. If the binder remains undecomposed even after the heat treatment, the binding ability thereof further improves such adhesion. Also, the use of a metal foil having an arithmetic mean surface roughness Ra of at least 0.2 μm as the current collector allows the binder to penetrate into recesses on a surface of the current collector. Then, an anchor effect is created between the binder and the current collector to further improve their adhesion. Accordingly, even if the active material expands and shrinks in volume as lithium is stored and released, shedding of the active material from the current collector can be restrained to result in obtaining satisfactory charge-discharge cycle performance characteristics.

The binder for use in the present invention preferably comprises polyimide. Polyimide, either thermoplastic or thermosetting, are useful. Also, polyimide can be obtained, for example, by subjecting polyamic acid to a heat treatment.

The heat treatment causes polyamic acid to undergo dehydrocondensation to produce polyimide. Preferably, such polyimide has an imidization level of at least 80%. The imidization level, as used herein, refers to a mole % of the produced polyimide relative to a polyimide precursor (polyamic acid). Polyimide with at least 80% imidization level can be obtained, for example, by subjecting an N-methyl-2-pyrrolidone (NMP) solution of polyamic acid to a heat treatment at a temperature of 100° C.-400° C. for over 1 hour. In an exemplary case where the heat treatment is carried out at 350° C., the imidization level reaches 80% in about 1 hour and 100% in about 3 hours.

In case of using polyimide as a binder, sintering is preferably carried out at a temperature insufficient to cause decomposition of polyimide, i.e., at 600° C. or below, because the binder in the present invention is preferred to remain fully undecomposed even after the heat treatment for sintering.

In the present invention, the amount by weight of the binder in the mix layer is preferably at least 5% of the total weight of the mix layer. Also preferably, the binder volume is at least 5% of the total volume of the mix layer. If the amount of the binder in the mix layer is excessively small, adhesion between the components within the electrode may become insufficient. If the amount of the binder in the mix layer is excessively large, an internal resistance of the electrode increases to occasionally result in the difficulty to initiate a charge. Accordingly, it is preferred that the amount by weight of the binder in the mix layer does not exceed 50% of the total weight of the mix layer. It is also preferred that the binder volume does not exceed 50% of the total volume of the mix layer.

The rechargeable lithium battery, according to another aspect of the present invention, includes a negative electrode prepared by providing, on a surface of a conductive metal foil as a current collector, a mix layer containing a binder and active material particles having a tendency to undergo a porosity increase that advances inside from particle surfaces during charge and discharge, and also includes a positive electrode and a nonaqueous electrolyte. Characteristically, the nonaqueous electrolyte contains carbon dioxide dissolved therein.

The active material particles which undergo a porosity increase that advances inside from particle surfaces during charge and discharge can be illustrated by silicon particles and silicon alloy particles. By dissolving carbon dioxide in the nonaqueous electrolyte, the occurrence of porosity increase of the active material particles and thickness increase of the electrode during charge and discharge is effectively reduced to result in the increased volumetric energy density of the battery.

A solvent of the nonaqueous electrolyte for use in the rechargeable lithium battery of the present invention is not particularly specified in type but can be illustrated by cyclic and chain carbonates. Examples of cyclic carbonates include ethylene carbonate, propylene carbonate, butylene carbonate and vinylene carbonate. Examples of chain carbonates include dimethyl carbonate, methyl ethyl carbonate and diethyl carbonate. The presence of the cyclic carbonate in the solvent of the nonaqueous electrolyte is particularly beneficial to formation of a film having a superior lithium-ion conducting capability on surfaces of active material particles. The use of the cyclic carbonate is therefore preferred. Particularly preferred are ethylene carbonate and propylene carbonate. A mixed solvent of a cyclic carbonate and a chain carbonate is also preferably used. It is particularly preferred that such a mixed solvent contains ethylene carbonate or propylene carbonate, and diethyl carbonate.

Also applicable is a mixed solvent which contains any of the above-listed cyclic carbonates and, an ether solvent such as 1,2-dimethoxyethane or 1,2-diethoxyethane or a chain ester such as γ-butyrolactone, sulfolane or methyl acetate.

Also, a solute of the nonaqueous electrolyte can be illustrated by $LiPF_6$, $LiBF_4$, $LiCF_3SO_3$, $LiN(CF_3SO_2)_2$, LiN $(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Particularly preferred is the use of a mixed solute of $LiXF_y$ (wherein X is P, As, Sb, B, Bi, Al, Ga or In; y is 6 if X is P, As or Sb and 4 if X is B, Bi, Al, Ga or In) with lithium perfluoroalkylsulfonyl imide $LiN(C_mF_{2m+1}SO_2)(C_nF_{2n+1}SO_2)$ (wherein m and n are independently integers of 1-4) or with lithium perfluoroalkylsulfonyl methide $LiN(C_pF_{2p+1}SO_2)(C_qF_{2q+1}SO_2)(C_rF_{2r+1}SO_2)$ (wherein p, q and r are independently integers of 1-4). Among them, the use of $LiPF_6$ is particularly preferred.

Applicable electrolytes include, for example, gelled polymer electrolytes comprised of an electrolyte solution impregnated into polymer electrolytes such as polyethylene oxide and polyacrylonitrile; and inorganic solid electrolytes such as LiI and $Li_3N$. The electrolyte for the rechargeable lithium battery of the present invention can be used without limitation, so long as a lithium compound as its solute that imparts ionic conductivity, as well as its solvent that dissolves and retains the lithium compound, remain undecomposed at voltages during charge, discharge and storage of the battery.

Examples of useful positive electrode materials for the rechargeable lithium battery of the present invention include lithium-containing transition metal oxides such as $LiCoO_2$, $LiNiO_2$, $LiMn_2O_4$, $LiMnO_2$, $LiCO_{0.5}Ni_{0.5}O_2$ and $LiNi_{0.7}CO_{0.2}Mn_{0.1}O_2$; and lithium-free metal oxides such as $MnO_2$. Other substances can also be used, without limitation, if they are capable of electrochemical lithium insertion and deinsertion.

The method of the present invention enables fabrication of the above-described rechargeable lithium battery of the present invention and is characterized as including the steps of providing a layer of a mixture of active material particles containing silicon and/or a silicon alloy and a binder on a surface of a conductive metal foil as a current collector and then sintering the mixture layer while being placed on the conductive metal foil to prepare a negative electrode, dissolving carbon dioxide in a nonaqueous electrolyte, and assembling a rechargeable lithium battery using the negative electrode, a positive electrode and the nonaqueous electrode.

In the fabrication method of the present invention, sintering is preferably performed under a non-oxidizing atmosphere to provide the negative electrode.

Various methods can be utilized to dissolve carbon dioxide in the nonaqueous electrolyte. For example, carbon dioxide is forced to contact with the nonaqueous electrolyte. Specifically, a carbon dioxide gas is blown into the nonaqueous electrolyte. This is an efficient and easy method resulting in obtaining the nonaqueous electrolyte containing dissolved carbon dioxide. Other useful methods include stirring the nonaqueous electrolyte under a carbon dioxide atmosphere, and contacting a high-pressure stream of carbon dioxide with the nonaqueous electrolyte. Alternatively, a carbon dioxide generator may be added to dissolve carbon dioxide in the nonaqueous electrolyte. Examples of carbon dioxide generators include polycarbonates and carbonates. Dry ice may also be used.

In the fabrication of a rechargeable lithium battery using the nonaqueous electrolyte containing dissolved carbon dioxide, it is preferred that the amount of carbon dioxide dissolved in the nonaqueous electrolyte is stably controlled. To this object, a rechargeable lithium battery is preferably assembled under the atmosphere including carbon dioxide. For example, a step of introducing the nonaqueous electrolyte containing dissolved carbon dioxide into the battery and the subsequent steps are preferably performed under the atmosphere including carbon dioxide. It is also preferred that, after being introduced into the battery, the nonaqueous electrolyte containing dissolved carbon dioxide is exposed to a high-pressure carbon dioxide atmosphere to stabilize the amount of dissolved carbon dioxide. The amount of carbon dioxide that can be dissolved to saturation varies with a temperature of the nonaqueous electrolyte. It is accordingly preferred that, in the fabrication steps, a control is provided to minimize a temperature variation of the rechargeable lithium battery.

Fabrication of the rechargeable lithium battery of the present invention may be carried out under the atmosphere including carbon dioxide so that carbon dioxide is dissolved in the nonaqueous electrolyte. For example, the battery before being sealed is left to stand under the atmosphere including carbon dioxide and is then sealed after a predetermined period of time to thereby dissolve carbon oxide in the nonaqueous electrolyte.

In the present invention, the mixture layer can be placed on a surface of the metal foil current collector by dispersing the active material particles in a binder solution to provide a slurry and then applying the slurry onto the surface of the metal foil current collector.

In the fabrication of the present invention, subsequent to provision of the mixture layer on a surface of the metal foil current collector but prior to sintering, the mixture layer and the underlying metal foil current collector are preferably rolled together. Such rolling increases a packing density of the mixture layer and thus improves adhesion between active material particles and between the mixture layer and the current collector, resulting in obtaining further improved charge-discharge cycle performance characteristics.

In the present invention, sintering is preferably carried out under a non-oxidizing atmosphere such as a vacuum atmosphere, or a nitrogen, argon or other inert gas atmosphere. Sintering may also be carried out under a hydrogen or other reducing atmosphere. Preferably, sintering is accomplished by a heat treatment at a temperature that does not exceed melting points of the metal foil current collector and the active material particles. For example, when a copper foil is used as the metal foil current collector, the heat treatment temperature is preferably controlled not to exceed a melting point of copper, i.e., 1083° C. It is more preferably within the range of 200-500° C., further preferably within the range of 300-450° C. Sintering can be achieved by a spark plasma sintering or hot pressing technique.

In accordance with the present invention, a rechargeable lithium battery can be provided which shows a high charge-discharge capacity and superior cycle characteristics, and in which a porosity increase of the active material particles during charge and discharge can be suppressed and accordingly a thickness increase of the electrode after charge and discharge can be retarded.

EXPLANATION OF THE REFERENCE NUMERALS

Figure 1:
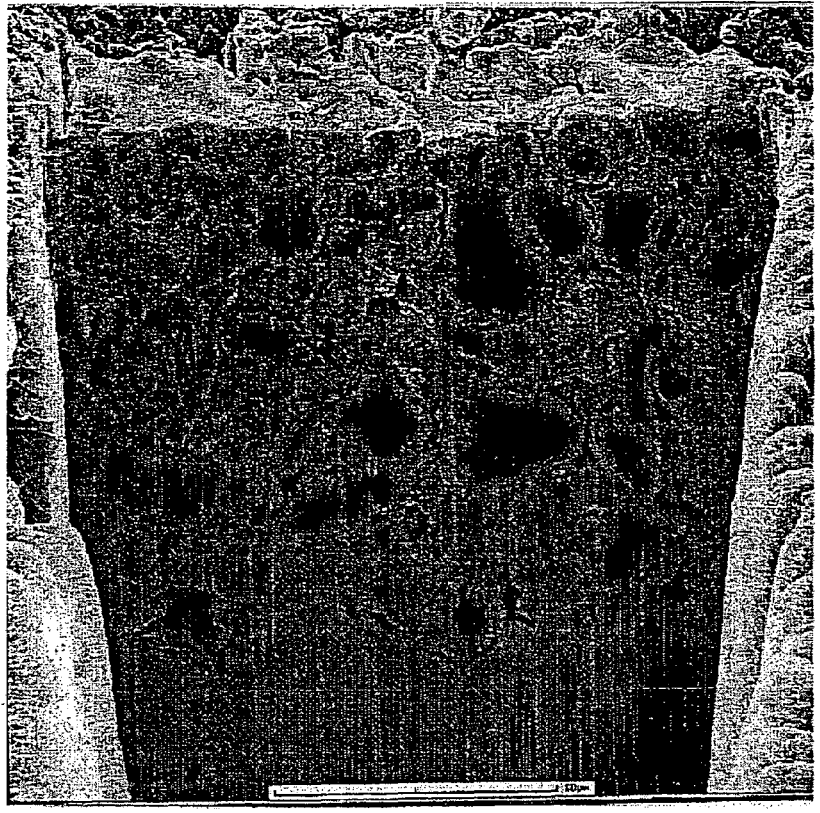
FIG. 1 is an FIB-SIM image showing a section of the negative electrode of the rechargeable lithium battery A1 in accordance with the present invention.

| 1 | outer casing |
|---|---|
| 2 | sealed portion |
| 3 | positive current-collecting tab |
| 4 | negative current-collecting tab |
| 5 | electrode assembly |

BEST MODE FOR CARRYING OUT THE INVENTION

The present invention is below described in more detail by way of Examples. The following examples merely illustrate the practice of the present invention but are not intended to be limiting thereof. Suitable changes and modifications can be effected without departing from the scope of the present invention.

EXPERIMENT 1

(Preparation of Negative Electrode)

81.8 parts by weight of silicon powder (99.9% pure) having a mean particle diameter of 3 μm as the active material particles was mixed in 8.6 wt. % N-methylpyrrolidone solution containing 18.2 parts by weight of polyimide as a binder to provide an anode mix slurry.

This anode mix slurry was coated on one surface (rough surface) of an electrolytic copper foil (35 μm thick) (current collector a1) having an arithmetic mean surface roughness Ra of 0.5 μm and then dried. A 25 mm×30 mm rectangular piece was cut out from the coated copper foil, rolled and then sintered by a heat treatment under argon atmosphere at 400° C. for 30 hours to provide a negative electrode. The sintered body (inclusive of the current collector) was 50 μm thick. Accordingly, the thickness of the anode mix layer was 15 μm, anode mix layer thickness/copper foil arithmetic mean surface roughness was 30, and anode mix layer thickness/copper foil thickness was 0.43.

In the negative electrode, polyimide was found to have a density of 1.1 g/cm$^3$ and constitute 31.8% of the total volume of the anode mix layer.

(Preparation of Positive Electrode)

Starting materials, $Li_2CO_3$ and $CoCO_3$, were weighed such that a ratio of numbers of Li and Co atoms, Li:Co, was brought to 1:1, and then mixed in a mortar. The mixture was pressed in a 17 mm diameter mold and fired in the air at 800° C. for 24 hours to obtain a fired product consisting of $LiCoO_2$. This product was then ground into particles with a mean particle diameter of 20 μm.

90 parts by weight of the resulting $LiCoO_2$ powder and 5 parts by weight of artificial graphite as an electric conductor were mixed in a 5 wt. % N-methylpyrrolidone (NMP) solution containing 5 parts by weight of polyvinylidene fluoride as a binder to provide a cathode mix slurry.

The cathode mix slurry was coated on an aluminum foil as a current collector, dried and then rolled. A 20 mm×20 mm square piece was cut out from the coated aluminum foil to provide a positive electrode.

(Preparation of Electrolyte Solution)

1 mole/liter of $LiPF_6$ was dissolved in a mixed solvent containing ethylene carbonate and diethyl carbonate at a 3:7 ratio by volume to prepare an electrolyte solution x. This electrolyte solution x was cooled to 5° C. Thereafter, a carbon dioxide gas was blown at a flow rate of 300 ml/min into the electrolyte solution x under a carbon dioxide atmosphere for about 30 minutes until a weight change of the electrolyte solution was leveled off. The resultant was elevated in temperature to 25° C. to prepare an electrolyte solution a1.

A weight of the electrolyte subsequent to and prior to blowing of a carbon oxide gas was measured and the amount of carbon dioxide dissolved in the electrolyte solution a1 was determined to be 0.37 weight %. The weight of the electrolyte solution subsequent to blowing of a carbon dioxide gas was measured under a carbon dioxide gas atmosphere.

(Fabrication of Battery)

The thus-prepared positive electrode, negative electrode and electrolyte solution were inserted into an outer casing made of an aluminum laminate to fabricate a rechargeable lithium battery A1. Fabrication of this rechargeable lithium battery was performed under a carbon dioxide gas atmosphere at ambient temperature and pressure.

Figure 7:
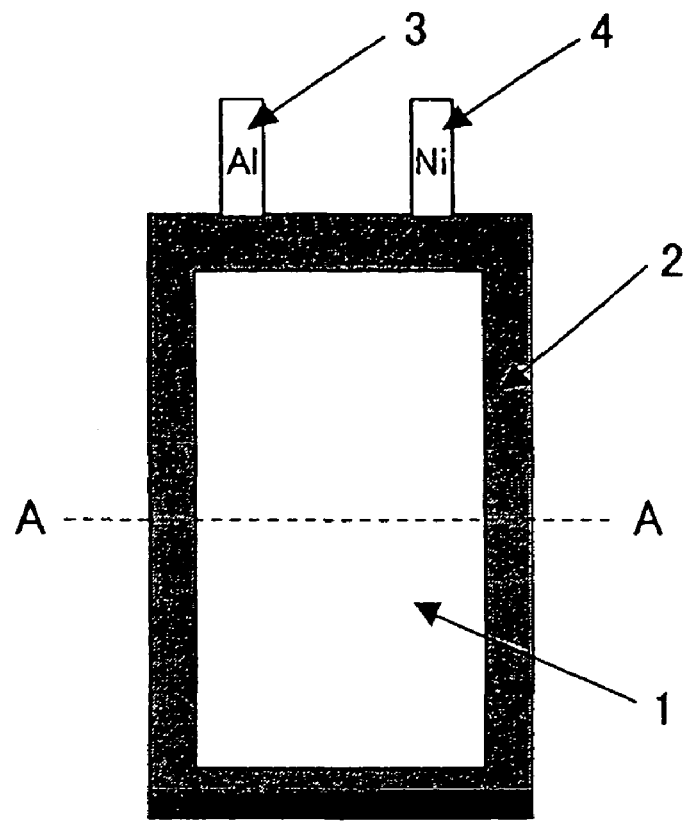
FIG. 7 is a plan view, showing the rechargeable lithium battery fabricated in the Example in accordance with the present invention.
Figure 8:
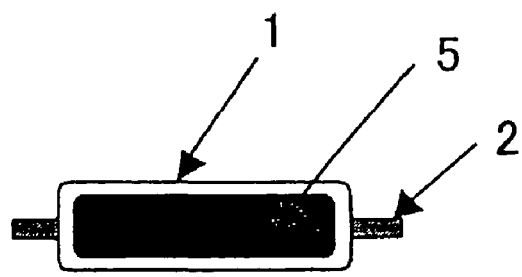
FIG. 8 is a sectional view, showing a section of the rechargeable lithium battery shown in FIG. 7.

FIG. 7 is a front view showing the rechargeable lithium battery fabricated. FIG. 8 is a sectional view taken along the line A-A of FIG. 7. The positive and negative electrodes are placed on opposite sides of a porous polyethylene separator to constitute an electrode assembly 5 for insertion into the outer casing 1 made of an aluminum laminate, as shown in FIG. 8. A positive current collecting tab 3, made of aluminum, is attached to the positive electrode such that its leading end extends through the outer casing 1 to an outside. A negative current collecting tab 4, made of nickel, is attached to the negative electrode such that its leading end extends through the outer casing 1 to an outside. As shown in FIGS. 7 and 8, the outer casing 1 is welded at its periphery to define a sealed portion 2.

EXPERIMENT 2

Carbon dioxide was not blown into the electrolyte solution x in Experiment 1. Instead, 5 weight % of vinylene carbonate was added thereto to prepare an electrolyte solution b1. The procedure of Experiment 1 was followed, except that the above-prepared electrolyte solution b1 was used and battery fabrication was performed under argon atmosphere, to fabricate a battery B1.

(Evaluation of Charge-Discharge Cycle Characteristics)

The above-fabricated batteries A1 and B1 were evaluated for charge-discharge cycle performance characteristics. Each battery was charged at 25° C. at a constant current of 14 mA to 4.2 V, charged at a constant voltage of 4.2 V to a current of 0.7 mA and then discharged at a current of 14 mA to 2.75 V. This was recorded as a unit cycle of charge and discharge. The battery was cycled to determine the number of cycles after which its discharge capacity fell down to 80% of its first-cycle discharge capacity and the determined cycle number was recorded as a cycle life. The results are shown in Table 2. The cycle life of each battery is indicated therein by an index when that of the battery A1 is taken as 100.

TABLE 2

| Battery | Amount of Carbon Dioxide Dissolved in Electrolyte Solution (wt. %) | Cycle Life |
| --- | --- | --- |
| A1 | 0.37 | 100 |
| B1 | 0 | 48 |

As can be clearly seen from Table 1, the battery A1 using the electrolyte solution a1 containing dissolved carbon dioxide shows a longer cycle life, compared to the battery B1 using the electrolyte solution b1 without dissolved carbon dioxide. The reason why vinylene carbonate is added to the electrolyte solution b1 is that without addition of carbon dioxide and vinylene carbonate to the electrolyte solution, the cycle life may become very short to result in the difficulty to observe porosity increase of the active material.

(FIB-SIM Observation)

After the above-described charge-discharge cycle test, the batteries A1 and B1 were disassembled to remove respective negative electrodes. A section of each negative electrode was observed with an FIB-SIM. By the FIB-SIM observation, it is meant that the negative electrode is processed with a focused ion beam (FIB) so that its section is exposed to an outside and then the exposed section is observed with a scanning ion microscope (SIM).

Figure 2:
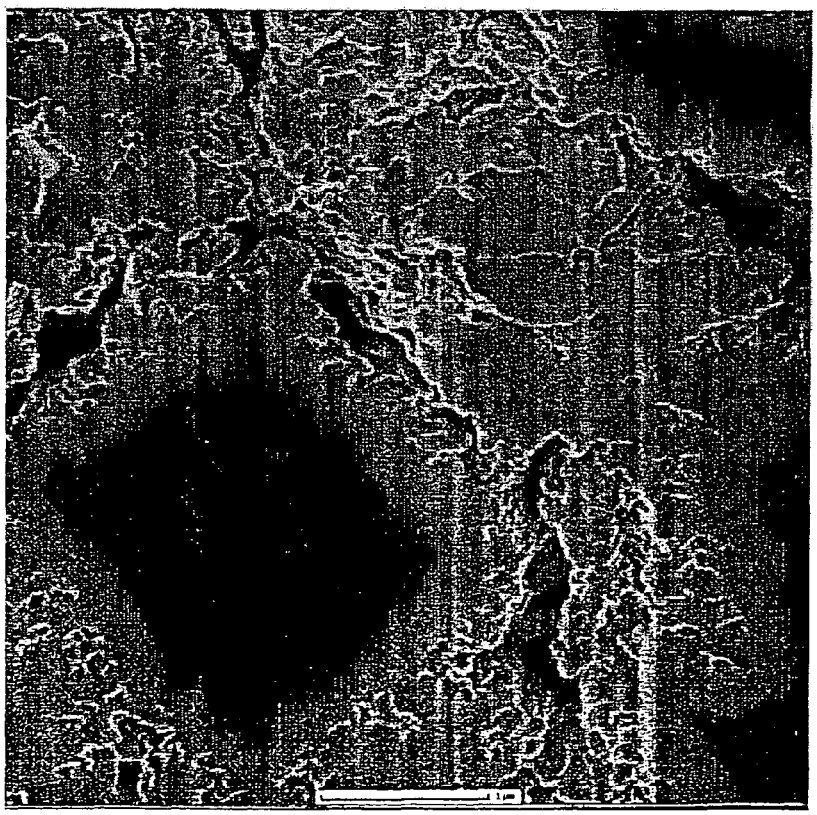
FIG. 2 is an FIB-SIM image showing a section of the negative electrode of the rechargeable lithium battery A1 in accordance with the present invention.
Figure 3:
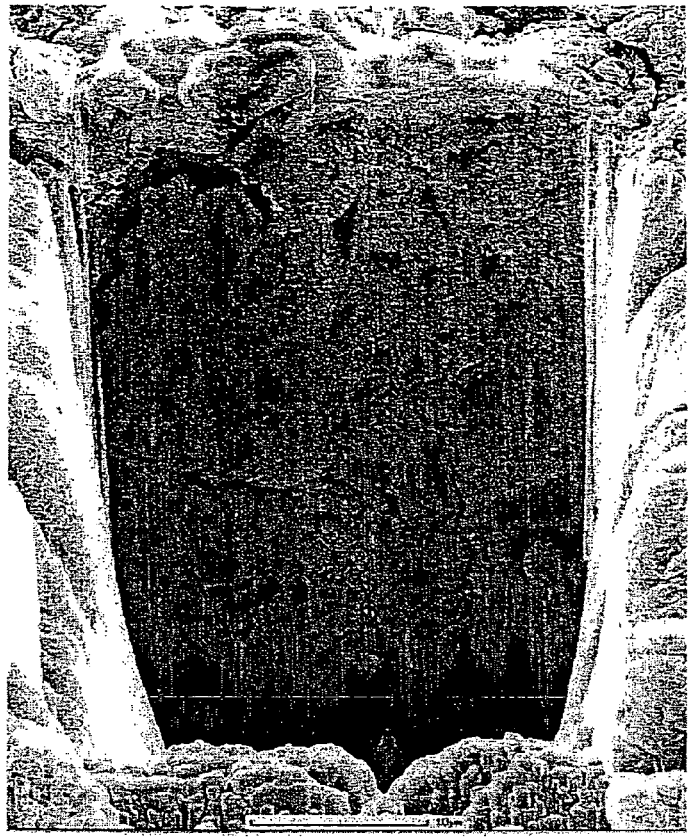
FIG. 3 is an FIB-SIM image showing a section of the negative electrode of the comparative battery B1.
Figure 4:
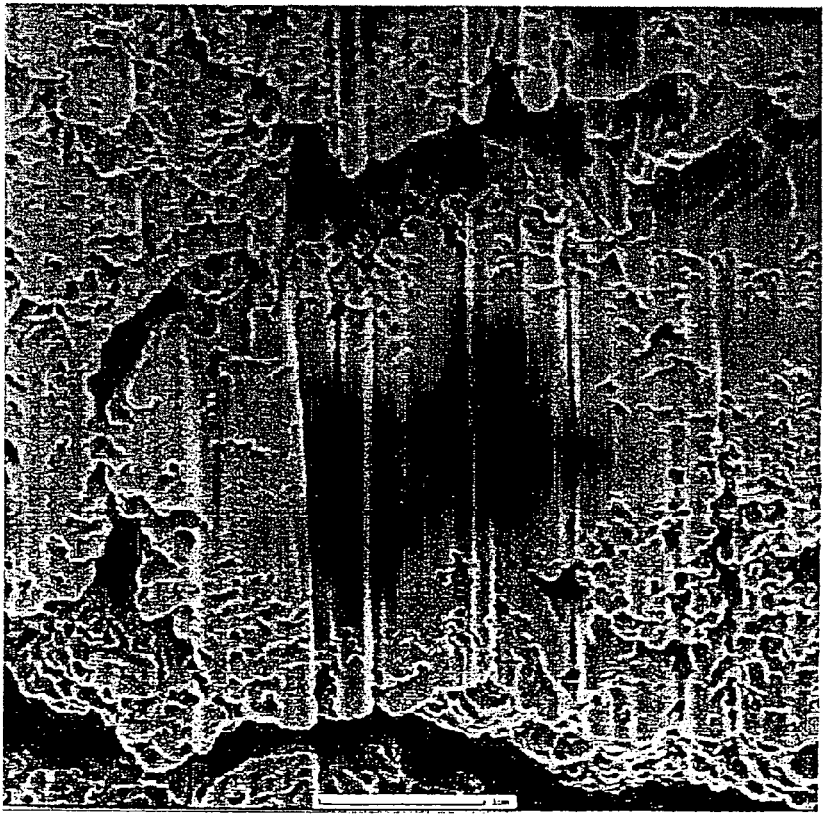
FIG. 4 is an FIB-SIM image showing a section of the negative electrode of the comparative battery B1.

FIGS. 1 and 2 are SIM images of the negative electrode of the battery A1, respectively. FIG. 2 is an enlarged representation of FIG. 1. FIGS. 3 and 4 are SIM images of the negative electrode of the battery B1, respectively. FIG. 4 is an enlarged representation of FIG. 3. Since the negative electrode is observed from above at an angle of 45 degrees relative to its section, the actual thickness dimension of an object in Figures is given by multiplying a dimension measured using a scale in each Figure (10 μm in FIGS. 1 and 3, and 1 μm in FIGS. 2 and 4) by the root of 2. Accordingly, a thickness of the mix layer in the negative electrode (shown in FIG. 1) of the battery A1 is found to be about 25 μm. Also, a thickness of the mix layer in the negative electrode (shown in FIG. 3) of the battery B1 is found to be about 42 μm.

In the mix layer shown in FIG. 1, dark portions indicate porous portions of active material particle and white portions indicate nonporous portions of active material particle. As can be seen from FIG. 1, only surface portions of the active material particle are rendered porous in the battery A1.

On the other hand, the increased dark portions and reduced white portions are observed in the negative electrode of the battery B1. This demonstrates that the increased portions are rendered porous in the negative electrode of the battery B1.

Also, the thickness increase of the mix layer in the battery B1 is larger than in the battery A1, as described above. This demonstrates that a larger increase in porosity of the active material particles results in the larger thickness increase of the mix layer in the negative electrode of the battery B1.

As can be appreciated from the forgoing, the use of an electrolyte solution containing dissolved carbon dioxide, in accordance with the present invention, retards increase in porosity of the active material particles and accordingly suppresses increase in thickness of the electrode. In accordance with the present invention, a thickness increase of a battery after charge-discharge cycling can be suppressed, so that the battery has a high volumetric energy density.

A detailed reason why the use of a nonaqueous electrolyte containing dissolved carbon dioxide retards porosity increase of the active material particles is not clear. However, it is believed that the carbon dioxide dissolved in the nonaqueous electrolyte acts to form, on a surface of the active material particle, a superior lithium-ion conducting film which restrains irreversible modification of the active material particle during charge and discharge and thus retard porosity increase of the active material particle.

EXPERIMENT 3

In this Experiment, the effect of the mean particle diameter of the silicon powder on the cycle characteristics was studied.

The procedure of Experiment 1 was followed, except that a silicon powder having a mean particle diameter of 20 μm was used, to fabricate a battery A2. Also, the procedure of Experiment 2 was followed, except that a silicon powder having a mean particle diameter of 20 μm was used, to fabricate a battery B2.

In accordance with the procedure in Experiment 2, these batteries were evaluated for cycle performance characteristics. The cycle life of each battery is indicated by an index when that of the battery A1 is taken as 100. In Table 3, the cycle lives of the batteries A1 and B1 are also shown.

TABLE 3

| Battery | Amount of Carbon Dioxide Dissolved in Electrolyte Solution (wt. %) | Mean Particle Diameter of Silicon Powder (μm) | Cycle Life |
| --- | --- | --- | --- |
| A1 | 0.37 | 3 | 100 |
| A2 | 0.37 | 20 | 64 |
| B1 | 0 | 3 | 48 |
| B2 | 0 | 20 | 22 |

As can be clearly seen from Table 3, the battery A1 using a silicon powder having a mean particle diameter of not exceeding 10 μm as the active material exhibits superior cycle performance, compared to the battery A2. It has been therefore found that the charge-discharge cycle performance improving effect obtained by using a nonaqueous electrolyte containing dissolved carbon dioxide becomes significant when an active material powder having a mean particle diameter of not exceeding 10 μm is used.

EXPERIMENT 4

In this Experiment, the effect of the arithmetic mean surface roughness Ra of the current collector on the cycle characteristics was studied.

The procedure of Experiment 1 was followed, except that the current collector a1 was replaced by an electrolytic copper foil having an arithmetic mean surface roughness of 0.2 μm or 0.17 μm, to fabricate a batteries A3 and A4.

These batteries were evaluated for cycle performance characteristics in the same manner as described above. The cycle life of each battery is indicated by an index when that of the battery A1 is taken as 100. In Table 4, the cycle life of the battery A1 is also shown.

TABLE 4

| Battery | Arithmetic Mean Surface Roughness of Current Collector (μm) | Cycle Life |
| --- | --- | --- |
| A1 | 0.5 | 100 |
| A3 | 0.2 | 80 |
| A4 | 0.17 | 63 |

As can be clearly seen from Table 4, the batteries A1 and A3 using the current collectors each having an arithmetic mean roughness Ra of 0.2 μm or above show superior cycle performance characteristics compared to the battery A4 using the current collector having an arithmetic mean roughness Ra of below 0.2 μm. This is probably because the use of the current collector having an arithmetic mean roughness Ra of 0.2 μm or above increases a contact area of the current collector with the active material particles to result in the effective sintering that improves adhesion between them, and also heightens the anchor effect of the binder on the current collector to thereby further improve adhesion between the mix layer and the current collector and, as a result, improve a current-collecting capability of the electrode.

EXPERIMENT 5

In this Experiment, the effect of the sintering condition on the cycle characteristics was studied.

The procedure of Experiment 1 was followed, except that the heat treatment for sintering was performed at 600° C. for 10 hours, to fabricate a battery A5.

This battery was evaluated for cycle performance characteristics in the same manner as described above. The cycle life of the battery is indicated by an index when that of the battery A1 is taken as 100. In Table 5, the cycle life of the battery A1 is also shown.

TABLE 5

| Battery | Heat-Treating Condisions for Negative Electrode | Cycle Life |
|---|---|---|
| A1 | 400° C., 30 hrs. | 100 |
| A5 | 600° C., 10 hrs. | 59 |

As can be clearly seen from Table 5, the battery A5 having the electrode made through heat treatment at 600° C. for 10 hours shows markedly deteriorated cycle performance characteristics, compared to the battery A1 having the electrode made through heat treatment at 400° C. for 30 hours. This is probably because when the heat treatment is carried out at 600° C., the adhesion between components within the electrode is markedly reduced, due to the decomposition of the binder serving to develop adhesion, to result in the reduction of the current-collecting capability.

EXPERIMENT 6

In this Experiment, the effect of the conductive powder loaded in the mix layer on the cycle characteristics was studied.

The procedure of Experiment 1 was followed, except that a nickel powder having a mean particle diameter of 3 μm was loaded in the mix layer in the amount of 20% of the total weight of the nickel powder and silicon powder, to fabricate a battery A6.

This battery was evaluated for cycle performance characteristics in the same manner as described above. The cycle life of the battery is indicated by an index when that of the battery A1 is taken as 100. In Table 6, the cycle life of the battery A1 is also shown.

TABLE 6

| Battery | Conductive Powder | Cycle Life |
|---|---|---|
| A1 | None | 100 |
| A6 | Ni | 102 |

As can be clearly seen from Table 6, the battery A6 having a nickel powder loaded in the mix layer shows improved cycle performance characteristics, compared to the battery A1 without loading of a nickel powder in the mix layer. This is probably because the conductive powder surrounds the active material particles to form a conductive network that improves a current collecting capability of the mix layer.

In the preceding embodiments, the mix layer was described to overlie one surface of the current collector of the negative electrode. However, the mix layer may be provided on each surface of the current collector. In such an instance, each current collector surface preferably has an irregular profile according to the present invention.

(TOF-SIMS Observation)

The present applicant has discovered that the negative electrode obtained by sputter depositing an amorphous silicon thin film on a conductive metal foil current collector also shows a porosity increase of active material during charge-discharge cycling, and that this porosity increase can be retarded by using a nonaqueous electrolyte containing carbon dioxide dissolved therein. The negative electrode having such a silicon thin film was utilized to fabricate batteries X1, Y1 and Y2. The battery X1 used a nonaqueous electrolyte containing dissolved carbon dioxide. The battery Y1 used a nonaqueous electrolyte to which carbon dioxide was not added. The battery Y2 used a nonaqueous electrolyte to which carbon dioxide was not added but vinylene carbonate (VC) was added in the amount of 20% by weight. For the initially-charged batteries X1, Y1 and Y2, a surface of each negative electrode was analyzed by TOF-SIMS (time of flight-secondary ion mass spectrometry).

Figure 5:
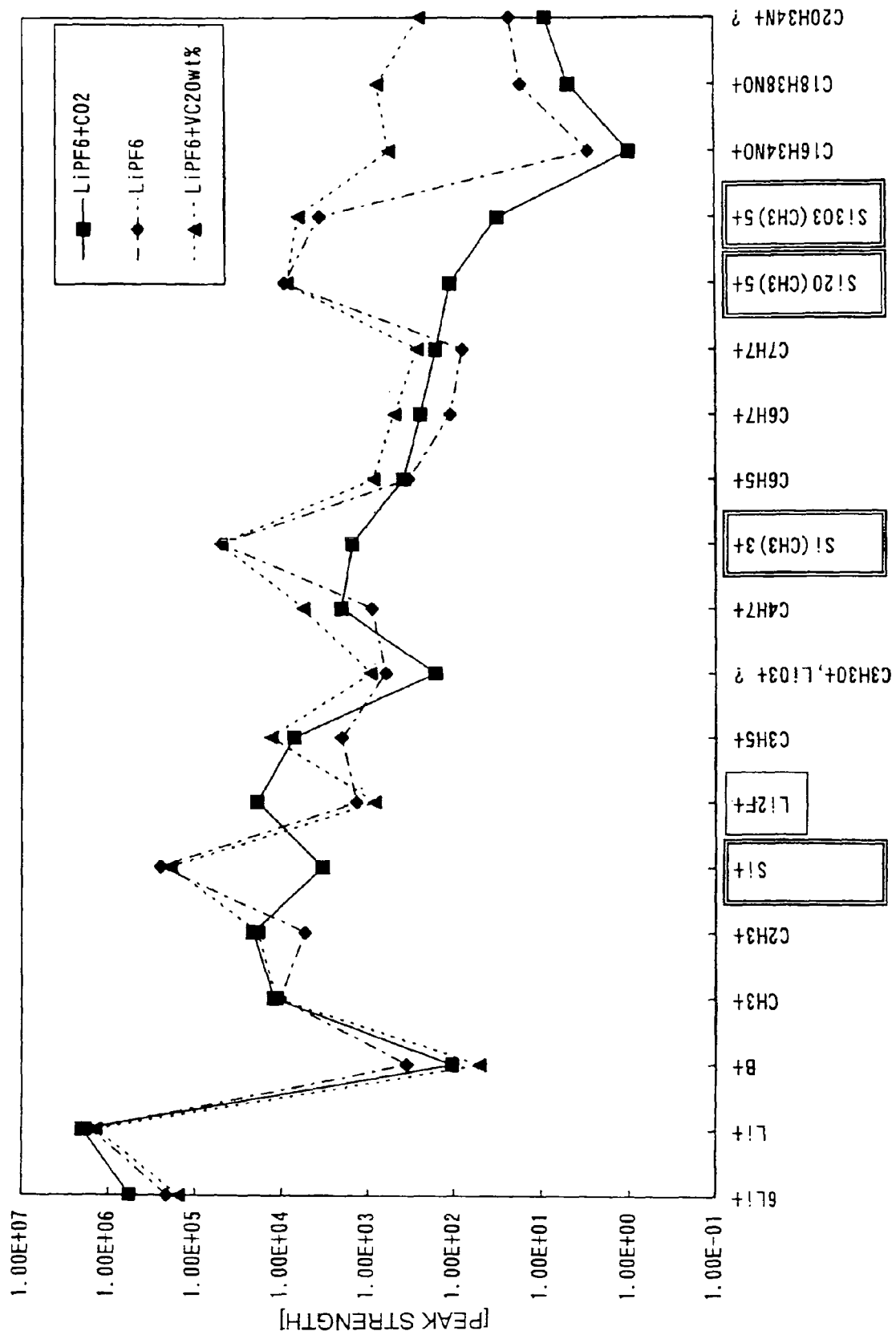
FIG. 5 is a spectrum showing the TOF-SIMS surface analysis results (positive ions) for the negative electrode.
Figure 6:
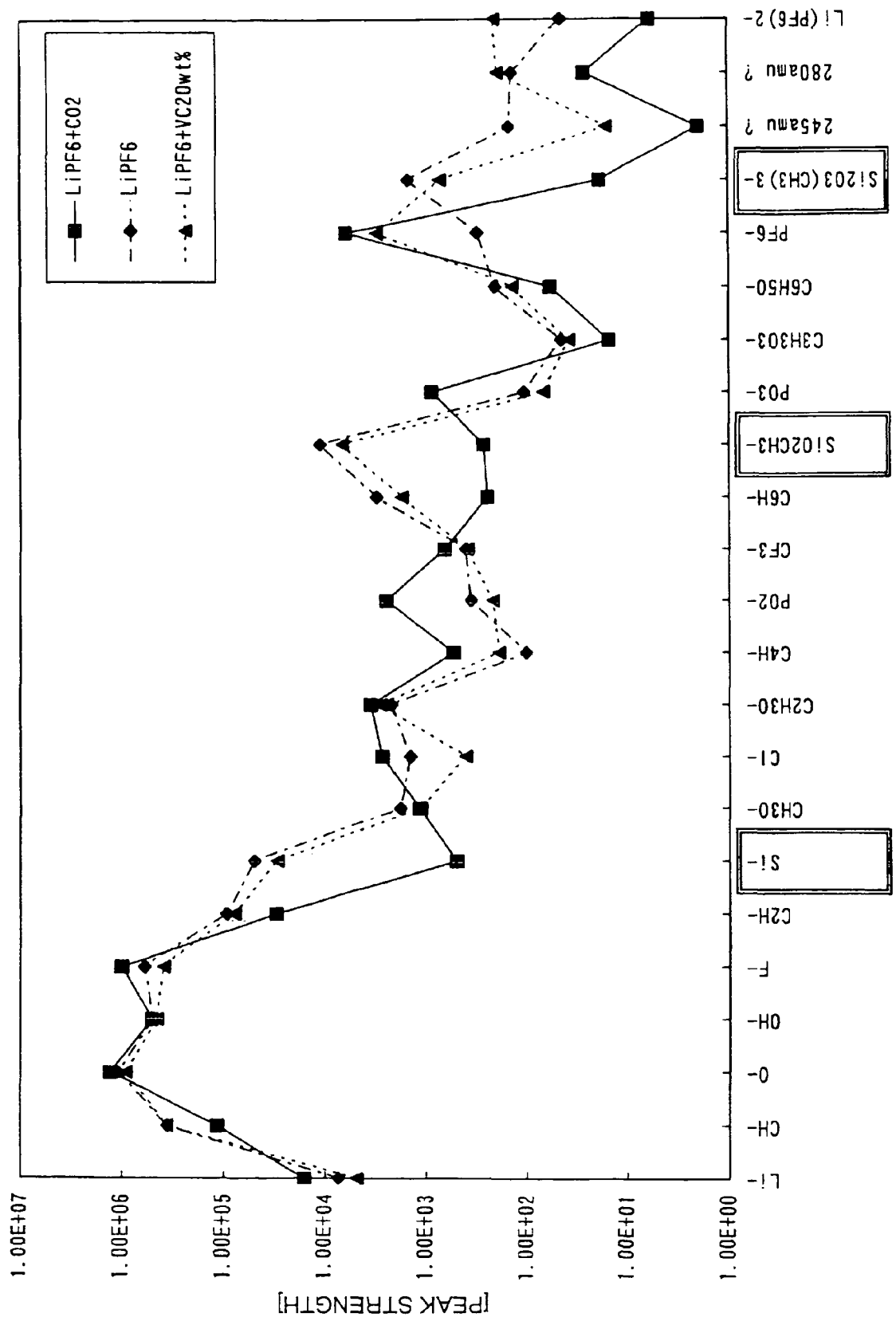
FIG. 6 is a spectrum showing the TOF-SIMS surface analysis results (negative ions) for the negative electrode.

FIG. 5 is a positive ion TOF-SIMS spectrum and FIG. 6 is a negative ion TOF-SIMS spectrum. In FIGS. 5 and 6, "LiPF6+CO2" shows a spectrum for the battery X1 of the present invention, "LiPF6" shows a spectrum for the battery Y1 and "LiPF6+VC20 wt %" shows a spectrum for the battery Y2.

As can be clearly seen from FIGS. 5 and 6, the markedly reduced Si ion and Si-containing ions and the increased $Li_2F^+$ ion at the surface of the negative electrode, relative to the batteries Y1 and Y2, are detected for the battery X1. This demonstrates that use of the nonaqueous electrolyte containing dissolved carbon dioxide results in the marked reduction in concentration of Si at the thin film surface. This is most probably due to the formation of an Si-free film on a surface of the silicon active material. It is believed that this film is a stable film having a high lithium-ion conducting capability and the formation of such a film on a silicon surface suppresses property change of silicon and retards porosity increase of the silicon particles in a charge-discharge process during which lithium ions are stored and released from silicon.

On the other hand, it appears that a film containing an Si active material is formed in the negative electrode for the batteries Y1 and Y2. The formation of such a film may be a probable cause of porosity increase at the surface of the active material. The use of the nonaqueous electrolyte containing dissolved carbon dioxide is considered to prevent formation of such a film and successfully retard increase in porosity of the active material.

Also in the present invention, such a stable film having a high lithium-ion conducting capability is believed to deposit on a surface of the active material particle, as similar to the above, and suppress change in property of the active material and accordingly retard porosity increase of the active material particle in a charge-discharge process during which lithium ions are stored and released from the active material particle.

EXPERIMENT 7

In this Experiment, the effect of the amount of carbon dioxide dissolved in the electrolyte solution on the cycle characteristics was studied.

(Preparation of Positive and Negative Electrodes)

The procedure of Experiment 1 was followed to prepare positive and negative electrodes.

(Preparation of Electrolyte Solution)

In accordance with the procedure of Experiment 1, the electrolyte solution x was prepared and then a carbon dioxide gas was blown into the electrolyte solution x to prepare the electrolyte solution a1.

The electrolyte solutions x and a1 at the volume ratio specified in Table 7 were mixed under an argon gas atmosphere to prepare electrolyte solutions a2, a3 and a4.

TABLE 7

| Amount of Carbon Dioxide Dissolved in Electrolyte Solution (wt. %) | Electrolyte Solution | Content of Electrolyte Solution X (vol. %) | Content of Electrolyte Solution a1 (vol. %) |
|---|---|---|---|
| 0.37 | a1 | 0 | 100 |
| 0.185 | a2 | 50 | 50 |
| 0.0925 | a3 | 75 | 25 |
| 0.037 | a4 | 90 | 10 |
| 0 | x | 100 | 0 |

(Fabrication of Batteries)

The procedure of Experiment 1 was followed to fabricate the rechargeable lithium battery A1 using the electrolyte solution a1.

In addition, the procedure of Experiment 1 was followed but under an ambient-pressure argon gas atmosphere to fabricate a battery A7 using the electrolyte solution a2, a battery A8 using the electrolyte solution a3, a battery A9 using the electrolyte solution a4 and a battery B3 using the electrolyte solution x.

(Evaluation of Charge-Discharge Cycle Characteristics)

The above-fabricated batteries were evaluated for cycle performance characteristics in the same manner as described above. The evaluation results are shown in Table 8.

The cycle life of each battery is indicated by an index when that of the battery A1 is taken as 100. In Table 8, the cycle life of the battery A1 is also shown.

Figure 9:
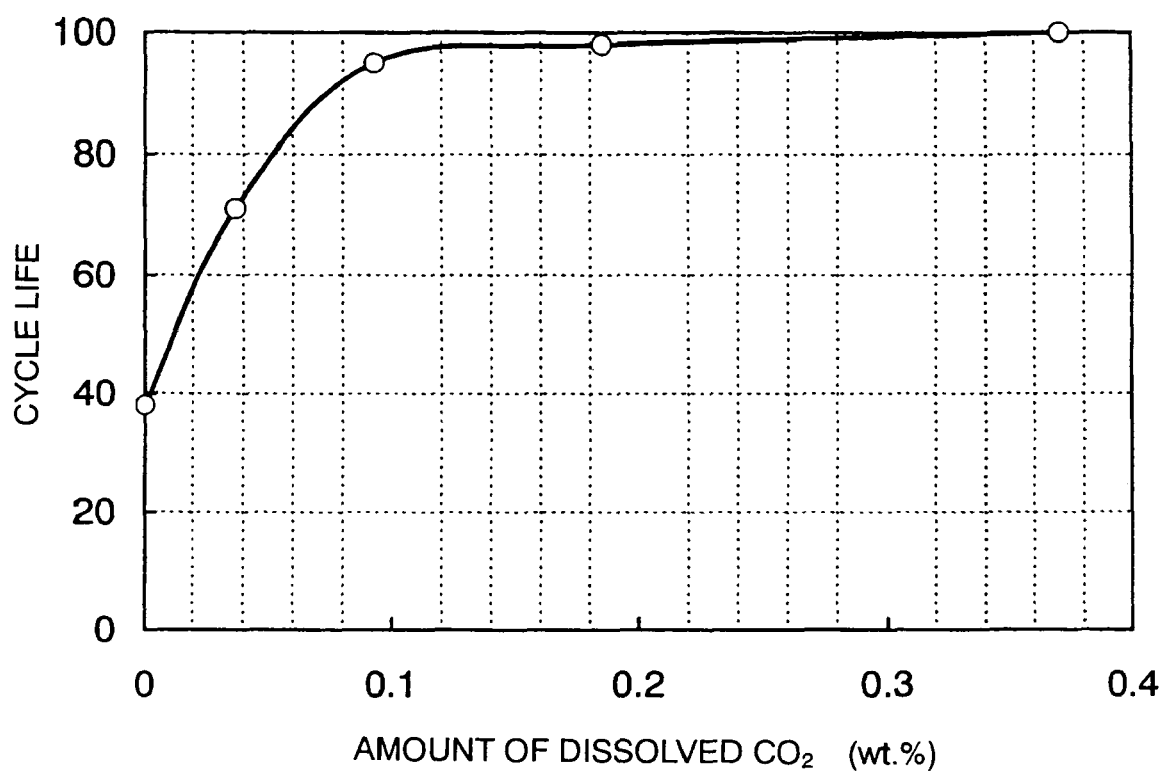
FIG. 9 is a graph showing the relationship between the cycle life and the amount of carbon dioxide dissolved in the nonaqueous electrolyte.

Also, FIG. 9 shows the relationship between the amount of carbon dioxide dissolved in the electrolyte solution and the cycle life of each battery.

TABLE 8

| Amount of Carbon Dioxide Dissolved in Electrolyte Solution (wt. %) | Battery | Electrolyte Solution | Cycle Life |
|---|---|---|---|
| 0.37 | A1 | a1 | 100 |
| 0.185 | A7 | a2 | 98 |
| 0.0925 | A8 | a3 | 95 |

TABLE 8-continued

| Amount of Carbon Dioxide Dissolved in Electrolyte Solution (wt. %) | Battery | Electrolyte Solution | Cycle Life |
|---|---|---|---|
| 0.037 | A9 | a4 | 71 |
| 0 | B3 | x | 38 |

As can be clearly seen from Table 8 and FIG. 9, the batteries A1 and A7-A9 using the electrolyte solution each containing at least 0.01% by weight of dissolved carbon dioxide exhibit longer cycle lives, compared to the battery B3 using the electrolyte solution x in which carbon dioxide was not dissolved. Also, if the amount of carbon dioxide dissolved in the electrolyte solution is at least 0.05% by weight, the cycle life exceeds approximately 80% of its saturation value. Further, as the amount of carbon dioxide dissolved in the electrolyte solution increases to 0.1% by weight, the cycle life approaches its saturation value.

The forgoing demonstrates that the amount of carbon dioxide dissolved in the electrolyte solution is preferably at least 0.01% by weight, more preferably at least 0.05% by weight, further preferably at least 0.1% by weight.

EXPERIMENT 8

In this Experiment, the effect of fluorine introduced in the nonaqueous electrolyte on the cycle characteristics was studied.

(Preparation of Electrolyte Solution)

1 mole/liter of $LiPF_6$ was dissolved in a mixed solvent containing ethylene carbonate and diethyl carbonate at a 3:7 ratio by volume to prepare an electrolyte solution P0. This electrolyte solution P0 was cooled to 5° C. Thereafter, a carbon dioxide gas was blown at a flow rate of 300 ml/min into the electrolyte solution P0 under a carbon dioxide atmosphere. Blowing was continued (for about 30 minutes) until a weight of the electrolyte solution was leveled off. The resultant was elevated in temperature to 25° C. to prepare an electrolyte solution P1.

The weight of the electrolyte solution subsequent to blowing of a carbon dioxide gas was measured under a carbon dioxide gas atmosphere to find a change in weight of the electrolyte solution. From the finding, the amount of a carbon dioxide gas dissolved in the electrolyte solution was 0.37% by weight.

The procedure used to prepare the electrolyte solution P0 was followed, except that $LiPF_6$ was replaced by $LiBF_4$, to prepare an electrolyte solution B0. As analogous to the electrolyte solution P1, a carbon dioxide gas was blown into the electrolyte solution B0 to prepare an electrolyte solution B1.

The procedure used to prepare the electrolyte solution P0 was followed, except that $LiPF_6$ was replaced by $LiN(C_2F_5SO_2)_2$, to prepare an electrolyte solution N0. As analogous to the electrolyte solution P1, a carbon dioxide gas was blown into the electrolyte solution N0 to prepare an electrolyte solution N1.

The procedure used to prepare the electrolyte solution P0 was followed, except that $LiPF_6$ was replaced by $LiClO_4$, to prepare an electrolyte solution C0. As analogous to the electrolyte solution P1, a carbon dioxide gas was blown into the electrolyte solution C0 to prepare an electrolyte solution C1.

(Fabrication of Battery)

The same positive and negative electrodes as used in Experiment 1 and the electrolyte solutions P1, B1, N1 and C1 were used to fabricate rechargeable lithium batteries AP1, AB1, AN1 and AC1. Battery fabrication was performed under a normal temperature and pressure carbon dioxide gas atmosphere.

Also, the same positive and negative electrodes as in Experiment 1 and the electrolyte solutions P0, B0, N0 and C0 were used to fabricate rechargeable lithium batteries AP0, AB0, AN0 and AC0. Battery fabrication was performed under a normal temperature and pressure argon gas atmosphere.

(Evaluation of Charge-Discharge Cycle Characteristics)

The above-fabricated batteries AP1, AB1, AC1, AP0, AB0 and AC0 were evaluated for charge-discharge cycle performance characteristics. Each battery at 25° C. was charged at a constant current of 14 mA to 4.2 V, charged at a constant voltage of 4.2 V to a current of 0.7 mA and then discharged at a current of 14 mA to 2.75 V. This was recorded as a unit cycle of charge and discharge.

The batteries AN1 and AN0 were charged and discharged by following the above charge-discharge sequence except that the constant-current charging was continued to 4.0 V.

The battery was cycled to determine the number of cycles after which its discharge capacity fell down to 80% of its first-cycle discharge capacity and the determined cycle number was recorded as a cycle life. The results are shown in Table 9.

In Table 9, the cycle life A is indicated by an index when a cycle life of the battery AP1 is taken as 100. The cycle life B is indicated by an index when a cycle life of the battery using the electrolyte solution containing dissolved carbon dioxide is taken as 100.

TABLE 9

| Lithium Salt | Electrolyte Solution | Battery | Dissolved Carbon Dioxide | Cycle Life A | Cycle Life B |
|---|---|---|---|---|---|
| $LiPF_6$ | P1 | AP1 | Present | 100 | 100 |
| $LiPF_6$ | P0 | AP0 | Absent | 38 | 38 |
| $LiBF_4$ | B1 | AB1 | Present | 44 | 100 |
| $LiBF_4$ | B0 | AB0 | Absent | 26 | 59 |
| $LiN(C_2F_5SO_2)_2$ | N1 | AN1 | Present | 87 | 100 |
| $LiN(C_2F_5SO_2)_2$ | N0 | AN0 | Absent | 39 | 45 |
| $LiClO_4$ | C1 | AC1 | Present | 42 | 100 |
| $LiClO_4$ | C0 | AC0 | Absent | 39 | 93 |

As can be clearly seen from Table 9, the batteries AP1, AB1, AN1 and AC1 each using the electrolyte solution containing dissolved carbon dioxide exhibit longer cycle lives than the batteries AP0, AB0, AN0 and AC0 in which carbon dioxide was not dissolved. Particularly, the batteries AP1, AB1 and AN1 using a fluorine-containing lithium salt show larger cycle life improvements, compared to the battery AC1 using a fluorine-free lithium salt. This appears to demonstrate that inclusion of the fluorine-containing lithium salt either promotes the action of carbon oxide to form a superior film or further improves a property of a film formed by the action of carbon dioxide. The fluorine-containing lithium salt may be decomposed during charge and discharge to produce a hydrogen fluoride or the like which affects the action of carbon dioxide to form a superior film. Such a film may reduce the amount of lithium ions that are consumed to form films on new surfaces produced as a result of division of active material during a charge-discharge reaction, thereby suppressing a decrease of a charge-discharge efficiency. Also, since the film formed on a surface of the active material particle has a superior lithium-ion conducting capability, it may allow a charge-discharge reaction to occur in more uniformly distributed regions of the active material particle. This is believed to lessen a strain produced when the active material undergoes a biased volumetric change as it stores and releases lithium and, as a result, improve a charge-discharge efficiency.

In the preceding embodiments, the negative current collector was described to have one irregular surface on which the active material layer was placed. The present invention is not limited to such an arrangement. The current collector may have irregularities on its both surfaces. In such a case, the active material layer may be placed on each irregular surface of the current collector to constitute a negative electrode.

EXPERIMENT 9

(Preparation of Electrolyte Solution)

1 mole/liter of $LiPF_6$ was dissolved in a mixed solvent containing ethylene carbonate (EC) and diethyl carbonate (DEC) at a 3:7 ratio by volume to prepare an electrolyte solution ED0.

This electrolyte solution ED0 was cooled to 5° C. Thereafter, a carbon dioxide gas was blown at a flow rate of 300 ml/min into the electrolyte solution ED0 under a carbon dioxide atmosphere. Blowing was continued (for about 30 minutes) until a weight change of the electrolyte solution was leveled off. The resultant was elevated in temperature to 25° C. to prepare an electrolyte solution ED1. The weight of the electrolyte solution subsequent to blowing of a carbon dioxide gas was measured under a carbon dioxide gas atmosphere to find a change in weight of the electrolyte solution prior to and subsequent to blowing of a carbon dioxide gas. From the finding, the amount of a carbon dioxide gas dissolved in the electrolyte solution was calculated at 0.37% by weight.

The procedure used to prepare the electrolyte solution ED1 was followed, except that propylene carbonate (PC) was used as the cyclic carbonate and diethyl carbonate (DEC) was used as the chain carbonate, to prepare an electrolyte solution. As analogous to the electrolyte solution ED1, a carbon dioxide gas was dissolved in this electrolyte solution to prepare an electrolyte solution PD1.

The procedure used to prepare the electrolyte solution ED1 was followed, except that propylene carbonate (PC) was used as the cyclic carbonate and methyl ethyl carbonate (MEC) was used as the chain carbonate, to prepare an electrolyte solution. As analogous to the electrolyte solution ED1, a carbon dioxide gas was dissolved in this electrolyte solution to prepare an electrolyte solution PM1.

The procedure used to prepare the electrolyte solution ED1 was followed, except that ethylene carbonate (EC) was used as the cyclic carbonate and methyl ethyl carbonate (MEC) was used as the chain carbonate, to prepare an electrolyte solution. As analogous to the electrolyte solution ED1, a carbon dioxide gas was dissolved in this electrolyte solution to prepare an electrolyte solution EM1.

Ethylene carbonate (EC) as the cyclic carbonate and diethyl carbonate (DEC) as the chain carbonate were mixed at a 1:1 ratio by volume to prepare a mixed solvent. As analogous to the electrolyte solution ED1, $LiPF_6$ and carbon dioxide were dissolved in the mixed solvent to prepare an electrolyte solution EDM1.

The amounts of carbon dioxide dissolved in the electrolyte solutions PD1, PM1, EM1 and EDM1 were 0.36% by weight, 0.64% by weight, 0.54% by weight and 0.46% by weight, respectively.

(Fabrication of Battery)

The same positive and negative electrodes as used in Experiment 1 and the above-prepared electrolyte solutions ED0, ED1, PD1, PM1, EM1 and EDM1 were used. Otherwise, the procedure of Experiment was followed to fabricate rechargeable lithium batteries. During fabrication of the batteries using the electrolyte solutions ED1, PD1, PM1, EM1 and EDM1, each set of the positive electrode, negative electrode and electrolyte solution was inserted into an aluminum laminate outer casing under a normal temperature and pressure carbon dioxide gas atmosphere.

In the fabrication of the battery using the electrolyte solution ED0 to which carbon dioxide was not dissolved, a set of the positive electrode, negative electrode and electrolyte solution was inserted into an aluminum laminate outer casing under a normal temperature and pressure argon gas atmosphere.

The batteries using the electrolyte solutions ED0, ED1, PD1, PM1, EM1 and EDML were designated as AED0, AED1, APD1, APM1, AEM1 and AEDM1, respectively.

The type of the electrolyte solution and the presence of dissolved carbon dioxide therein, for the above-fabricated batteries, are listed in the following Table.

TABLE 10

| Electrolyte Solution | Electrolyte Solution | Battery | Dissolved Carbon Dioxide |
|---|---|---|---|
| $LiPF_6$/EC + DEC (3/7) | ED0 | AED0 | Absent |
| $LiPF_6$/EC + DEC (3/7) | ED1 | AED1 | Present |
| $LiPF_6$/PC + DEC (3/7) | PD1 | APD1 | Present |
| $LiPF_6$/PC + MEC (3/7) | PM1 | APM1 | Present |
| $LiPF_6$/EC + MEC (3/7) | EM1 | AEM1 | Present |
| $LiPF_6$/EC + DMC (1/1) | EDM1 | AEDM1 | Present |

(Evaluation of Charge-Discharge Cycle Characteristics)

The above-fabricated batteries were each evaluated for charge-discharge cycle performance characteristics in the same manner as in Experiment 1. The cycle life of each battery is indicated therein by an index when that of the battery AED1 is taken as 100. The results are shown in Table 11.

TABLE 11

| Electrolyte Solution | Electrolyte Solution | Battery | Amount of Dissolved Carbon Dioxide in Electrolyte Solution (wt. %) | Cycle Life |
|---|---|---|---|---|
| $LiPF_6$/EC + DEC (3/7) | ED0 | AED0 | 0 | 38 |
| $LiPF_6$/EC + DEC (3/7) | ED1 | AED1 | 0.37 | 100 |
| $LiPF_6$/PC + DEC (3/7) | PD1 | APD1 | 0.36 | 108 |
| $LiPF_6$/PC + MEC (3/7) | PM1 | APM1 | 0.64 | 75 |
| $LiPF_6$/EC + MEC (3/7) | EM1 | AEM1 | 0.54 | 91 |
| $LiPF_6$/EC + DMC (1/1) | EDM1 | AEDM1 | 0.46 | 70 |

As can be clearly seen from the results shown in Table 11, the battery APD1 using propylene carbonate as the cyclic carbonate and diethyl carbonate as the chain carbonate shows superior cycle performance characteristics, compared to the battery AED1 using ethylene carbonate as the cyclic carbonate and diethyl carbonate as the chain carbonate. In the case of a graphite negative electrode, propylene carbonate is not generally used. However, in the case of a silicon negative electrode, the use of propylene carbonate has been found to provide a good result. This is probably because when propylene carbonate is used, the electrolyte solution increases its viscosity and becomes easier to impregnate into the electrode than when ethylene carbonate is used and, as a result, a more homogeneous film is formed on a silicon surface to suppress a capacity drop at an initial stage of cycling.

As can be appreciated, the cycle life improving effect has been also obtained for the other batteries APM1, AEM1 and AEDM1 when containing dissolved carbon dioxide in their respective electrolyte solutions.

REFERENCE EXPERIMENT (Preparation of Carbon Negative Electrode)

Artificial graphite as a negative active material and a styrene-butadiene rubber as a binder were mixed in an aqueous solution of carboxy methyl cellulose as a thickener so that the mixture contained the active material, binder and thickener in the ratio by weight of 95:3:2. The mixture was then kneaded to prepare a negative electrode slurry. The prepared slurry was applied onto a copper foil as a current collector, dried and rolled by a pressure roll. Subsequent attachment of a current collecting tab resulted in the preparation of a negative electrode.

(Preparation of Positive Electrode)

90 parts by weight of $LiCoO_2$ powder and 5 parts by weight of artificial graphite powder as an electric conductor were mixed in a 5 wt. % N-methylpyrrolidone aqueous solution containing 5 parts by weight of polytetrafluoroethylene as a binder to provide a cathode mix slurry. This slurry was coated by a doctor blade process on an aluminum foil as a positive current collector and then dried to form a layer of positive active material. A positive tab was attached onto an aluminum foil region left uncoated with the positive active material layer to prepare a positive electrode.

(Preparation of Nonaqueous Electrolyte)

1 mole/liter of $LiPF_6$ was dissolved in a mixed solvent containing ethylene carbonate and diethyl carbonate at a 3:7 ratio by volume to prepare a solution.

Vinylene carbonate was added to this solution in the amount of 2% by weight to prepare a nonaqueous electrolyte c2.

Carbon dioxide was blown for 30 minutes into the nonaqueous electrolyte c2 at 25° C. until carbon dioxide was dissolved therein to saturation. As a result, a nonaqueous electrolyte c1 was obtained. The amount of dissolved carbon dioxide was 0.37 weight %.

The nonaqueous electrolytes c1 and c2 are clarified as follows:
  nonaqueous electrolyte c1: a nonaqueous electrolyte in which $CO_2$ was dissolved;
  nonaqueous electrolyte c2: a nonaqueous electrolyte in which $CO_2$ was not dissolved.

(Fabrication of Batteries)

Rechargeable lithium batteries were fabricated using the above-prepared negative electrode, positive electrode and nonaqueous electrolytes. The positive and negative electrodes were rolled up in a cylindrical configuration with a porous polyethylene separator between them. This electrode group and each nonaqueous electrolyte were inserted in an outer casing made of an aluminum laminate. The outer casing was heat sealed at its peripheries such that leading ends of the positive and negative current collecting tabs extended outwardly from the outer casing, thereby completing fabrication of the battery.

The particulars of the fabricated batteries are listed in Table 12.

TABLE 12

| | |
|---|---|
| Thickness (mm) | 3.6 |
| Width (mm) | 35 |
| Height (mm) | 62 |
| Designed Capacity (mAh) | 600 |
| Number of Turns | 9 |
| Thickness of Negative Active Material Layer (μm) | 53.5 |

The battery fabricated using the nonaqueous electrolyte c1 was designated as C1. The battery fabricated using the nonaqueous electrolyte c2 was designated as C2. Fabrication of the battery C1 was carried out in the high-purity carbon dioxide gas atmosphere.

(Charge-Discharge Cycle Test)

The thus-fabricated rechargeable lithium batteries C1 and C2 were subjected to a charge-discharge cycle test. Each battery at 25° C. was charged at a constant current of 600 mA to 4.2 V, charged at a constant voltage of 4.2 V to 30 mA and then discharged at a current of 600 mA to 2.75 V. This was recorded as a unit cycle of charge and discharge. The 500th-cycle discharge capacity was divided by the 1st-cycle discharge capacity to give a capacity retention rate as shown in Table 13. Table 13 also shows a thickness increase of the battery after 500 cycles and a thickness increase of the active material per layer of the electrode as calculated from the value for the thickness increase of the battery.

TABLE 13

| Battery | Capacity Retention After 500 Cycles (%) | Thickness Increase of Battery After 500 Cycles (μm) | Thickness Increase of Active Material Layer Per Layer of Electrode (μm) |
|---|---|---|---|
| C1 | 88.9 | 148 | 8 |
| C2 | 88.2 | 150 | 8 |

As can be clearly seen from the results shown in Table 13, dissolving of carbon dioxide in a nonaqueous electrolyte is little effective to retard deterioration of cyclic performance and suppress increase in thickness of the battery using a carbon material as the negative active material.

The invention claimed is:

1. A rechargeable lithium battery including a negative electrode made by sintering a layer of a mixture of silicon particles, which undergo a porosity increase that advances inside from particle surfaces during charge and discharge, and a binder on a surface of a conductive metal foil current collector, a positive electrode and a nonaqueous electrolyte, characterized in that said nonaqueous electrolyte contains carbon dioxide dissolved therein in addition to carbon dioxide formed during fabrication of the battery and forms a film having a lithium-ion conducting capability on a surface of said negative electrode,
wherein the amount of added carbon dioxide dissolved in said nonaqueous electrolyte is at least 0.1 by weight.

2. The rechargeable lithium battery as recited in claim 1, characterized in that said sintering is performed under a non-oxidizing atmosphere.

3. The rechargeable lithium battery as recited in claim 1, characterized in that carbon dioxide is further contained in an inner space of the battery.

4. The rechargeable lithium battery as recited in claim 1, characterized in that said nonaqueous electrolyte contains a cyclic carbonate.

5. The rechargeable lithium battery as recited in claim 1, characterized in that said nonaqueous electrolyte contains a mixed solvent of a cyclic carbonate and a chain carbonate.

6. The rechargeable lithium battery as recited in claim 4, characterized in that said cyclic carbonate includes ethylene carbonate and/or propylene carbonate.

7. The rechargeable lithium battery as recited in claim 4, characterized in that said cyclic carbonate is ethylene carbonate.

8. The rechargeable lithium battery as recited in claim 4, characterized in that said cyclic carbonate is propylene carbonate.

9. The rechargeable lithium battery as recited in claim 5, characterized in that said chain carbonate includes at least one of dimethyl carbonate, diethyl carbonate and methyl ethyl carbonate.

10. The rechargeable lithium battery as recited in claim 1, characterized in that said nonaqueous electrolyte further contains a fluorine-containing compound.

11. The rechargeable lithium battery as recited in claim 10, characterized in that said fluorine-containing compound is a fluorine-containing lithium salt.

12. The rechargeable lithium battery as recited in claim 11, characterized in that said fluorine-containing lithium salt is $LiXF_y$ (wherein X is P, As, Sb, B, Bi, Al, Ga or In; y is 6 if X is P, As or Sb and y is 4 if X is B, Bi, Al, Ga or In) or $LiN(C_mF_{2m+1}SO_2)(C_nF_{2n+1}SO_2)$ (wherein m and n are independently integers of 1-4).

13. The rechargeable lithium battery as recited in claim 11, characterized in that said fluorine-containing lithium salt is at least one selected from $LiPF_6$, $LiBF_4$ and $LiN(C_2F_5SO_2)_2$.

14. The rechargeable lithium battery as recited in claim 1, characterized in that said silicon particles have a mean particle diameter of 10 μm or below.

15. The rechargeable lithium battery as recited in claim 1, characterized in that said current collector has an arithmetic mean surface roughness Ra of at least 0.2 μm.

16. The rechargeable lithium battery as recited in claim 1, characterized in that said current collector comprises a copper foil, a copper alloy foil or a metal foil having a copper or copper alloy surface layer.

17. The rechargeable lithium battery as recited in claim 1, characterized in that said current collector comprises an electrolytic copper foil, an electrolytic copper alloy foil or a metal foil having an electrolytic copper or copper alloy surface layer.

18. The rechargeable lithium battery as recited in claim 1, characterized in that said binder remains even after a heat treatment for the sintering.

19. The rechargeable lithium battery as recited in claim 1, characterized in that said binder comprises polyimide.

20. The rechargeable lithium battery as recited in claim 1, characterized in that an electric conductor is mixed in said mixture layer.

21. A method for fabricating a rechargeable lithium battery including a negative electrode, a positive electrode and a nonaqueous electrolyte, characterized as comprising the steps of:
providing a layer of a mixture of silicon particles, which particles undergo a porosity increase that advances inside from particle surfaces during charge and discharge, and a binder on a surface of a conductive metal foil as a current collector and sintering the mixture layer while being placed on said surface of the conductive metal foil to prepare said negative electrode;
dissolving carbon dioxide in said nonaqueous electrolyte in an amount of at least 0.1% by weight; and assembling a rechargeable lithium battery using said negative electrode, positive electrode and nonaqueous electrolyte, wherein a film having a lithium-ion conducting capability is formed on a surface of said negative electrode by the dissolving of the carbon dioxide in the said nonaqueous electrolyte.

22. The method for fabricating a rechargeable lithium battery as recited in claim 21, characterized in that said sintering is performed under a non-oxidizing atmosphere.

23. The method for fabricating a rechargeable lithium battery as recited in claim 21, characterized in that the step of dissolving carbon dioxide in the nonaqueous electrolyte includes a step of blowing gaseous carbon dioxide into the nonaqueous electrolyte.

24. The method for fabricating a rechargeable lithium battery as recited in claim 21, characterized in that the step of assembling a rechargeable lithium battery includes a step of assembling a rechargeable lithium battery under the atmosphere including carbon dioxide.

* * * * *